United States Patent Office 2,890,710
Patented June 16, 1959

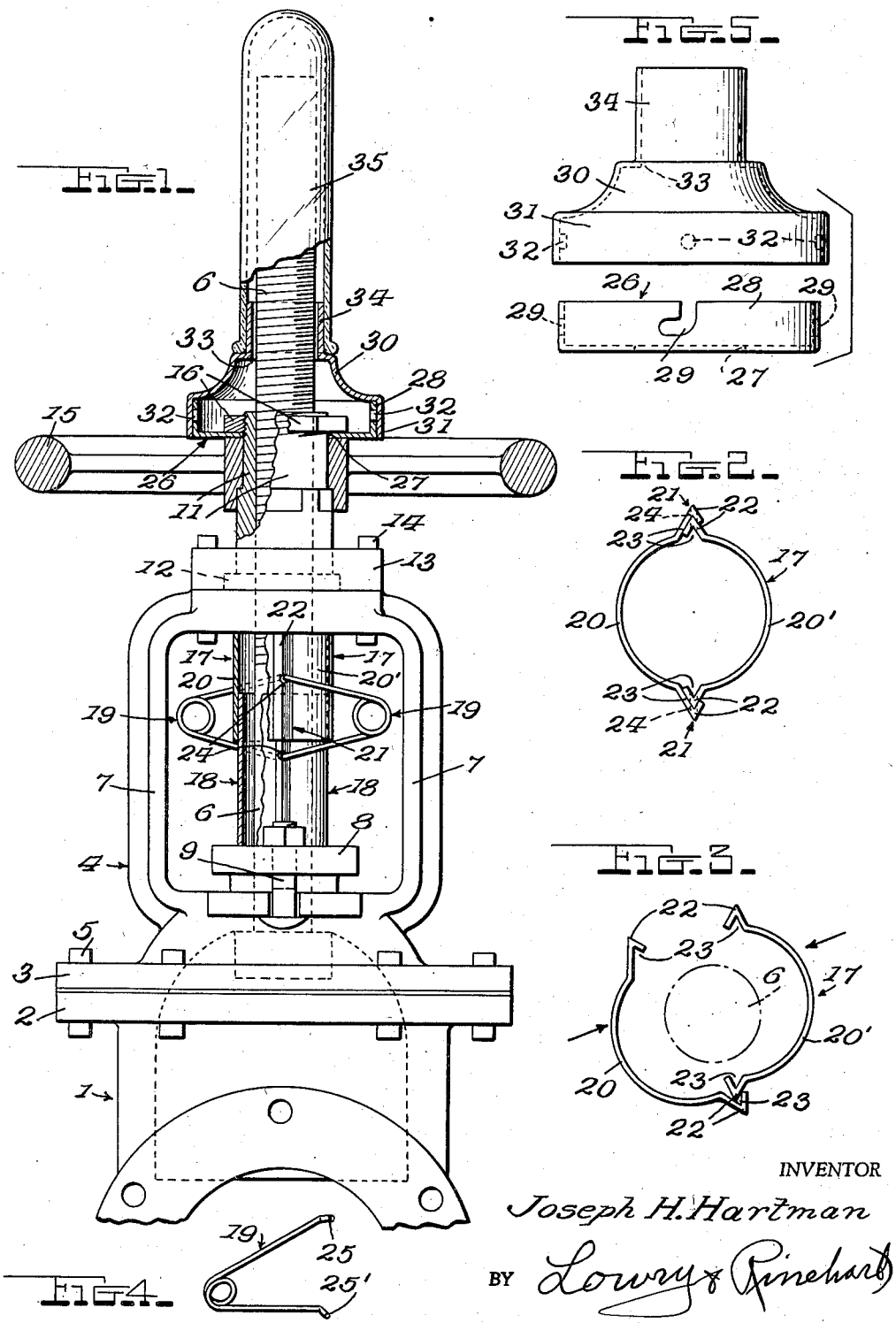

2,890,710
PROTECTOR

Joseph Henery Hartman, Norristown, Pa.

Application August 21, 1957, Serial No. 679,439

2 Claims. (Cl. 137—382)

This invention aims generally to provide a new and improved protecting device for protecting valve actuating shanks or other elements which may be exposed to dirt, grime, chemicals, gases, snow, ice, etc.

Specifically, the invention aims to simplify and reduce the manufacturing cost of the protector shown in my U.S. Patent 2,578,629 of May 31, 1949.

The invention also aims to improve upon the protector shown in my U.S. Patent 2,578,630 of May 31, 1949.

Figure 1 is a side elevation, partly broken away and in section, showing the invention applied to a gate valve;

Fig. 2 is an end view of one of the two telescoped sleeves shown in Fig. 1;

Fig. 3 is an end view showing how the two halves of each sleeve may be relatively assembled around an element to be protected;

Fig. 4 is a perspective view of one of the springs shown in Fig. 1; and

Fig. 5 is a side elevation of elements of the protecting means shown at the upper portion of Fig. 1.

For illustrative purposes, the invention has been shown as applied to a gate valve. The valve head is shown in dotted lines in the casing 1 which has a flange 2 on top, to which is attached the flange 3 of a yoke member 4 by means of bolts 5. The valve shank 6 passes through said yoke member between its leg portions 7 and is provided with a packing gland 8 where it passes into the valve casing through the bottom of the yoke member. The packing gland is adjusted by a pair of bolts 9.

The outer end of the valve shank is threaded through a swivelled nut 11 rotatably mounted in the outer end of the yoke member. For this purpose the nut has a flange 12 freely mounted in the flange guide or bearing formed by the counterbored collar 13 fixed to the yoke by bolts 14.

A handwheel 15 is splined onto the nut 11 for turning the nut to operate the valve. The valve shank 6, being threadedly engaged with said nut, and being restricted itself against rotation since it is fixed to the gate valve head which is not rotatable, is therefore moved axially when the nut is turned to either open or close the valve. The handwheel 15 is secured upon the upper end of the nut 11 by means of a lock nut 16.

A novel protector is provided for the portion of the shank 6 within the confines of the yoke 4. This protector comprises an outer sleeve 17, an inner sleeve 18 slidably telescoped with said outer sleeve, and two substantially U-shaped springs 19 connected with said sleeves and exerting force to relatively extend them into tight contact with the upper end of the yoke 4 and the gland 8, respectively.

The two sleeves 17 and 18 are formed from any suitable resilient metal or other resilient material. Except for size, the two sleeves are identical and a description of one will therefore suffice for both. The outer sleeve 17 has been selected for this purpose. This sleeve is composed of two longitudinal snapped-together halves 20 and 20' having rib-and-groove connections 21 along their longitudinal edges.

In forming the connections 21, the edges of each sleeve half 20 or 20' are bent to provide each edge with an external longitudinal rib 22 and with an internal groove 23 coextensive with said rib 22. The ribs 22 of the sleeve half 20' are received in the grooves 23 of the half 20 as seen in Fig. 2. The two halves 20 and 20' may thus be readily assembled around the shank 6 and easily snapped together, as shown in Fig. 3.

The ribs 22 at opposite sides of the sleeve 17 are formed with registering radial openings 24 to receive the upper laterally bent ends 25 of the two springs 19. The corresponding openings of the inner sleeve 18 are adapted to receive the lower laterally bent ends 25' of the springs 19. Thus, when the entire protector is in assembled condition, the springs 19 hold the two halves of each sleeve 17, 18 against relative sliding and exert force to relatively extend the two sleeves into contact with the upper end of the yoke 4 and the gland 8, respectively.

In the assembled structure, the grooves 23, of the upper sleeve 17, slidably receive the external ribs of the lower sleeve 18 and thus the two sleeves are held against relative turning.

A flanged metal cap 26 is shown secured upon the upper end of the nut 11, by means of the lock nut 16, said cap having a central opening 27 through which said nut 11 extends. The flange 28 of this cap 26 is formed with bayonet slots 29.

A metal dome 30 is provided with a side wall 31 which surrounds the flange 28, said side wall having studs 32 received in the bayonet slots 29. The top of the dome 30 has a central opening 33 and an upstanding flange 34 around said opening.

A protecting tubular receptacle 35, of glass or plastic, is provided around the projecting upper end of the shank 6, said receptacle having an open lower end fitting around the flange 34. In case the receptacle 35 should become broken, another may be readily substituted without removing the dome 30 from the cap 26.

It will be seen from the foregoing that simple and inexpensive yet reliable provision has been disclosed for attaining the desired ends. However, it is of course possible to make minor variations within the scope of the invention, such as in constructional details, and also to form the sleeves 17 and 18, the cap 26, the dome 30 and receptacle 35 of metal, plastic or glass, or combinations of these materials, depending upon the mineral or organic conditions present in different plants.

What I claim is:

1. A protecting device comprising an outer resilient sleeve, an inner resilient sleeve slidably telescoped within said outer sleeve, each of said sleeves being composed of two longitudinal halves, each longitudinal edge of each of said halves being provided with a longitudinal groove and an edge rib coextensive with said sleeve, the two longitudinal ribs of one half of each sleeve being snapped into the two longitudinal grooves of the other half of the same sleeve, the two longitudinal ribs of said inner sleeve being slidably received in the two longitudinal grooves of said outer sleeve, and spring means connected with said inner and outer sleeves and exerting pressure to relatively extend said sleeves.

2. A structure as specified in claim 1, wherein the ribs of the two halves of each sleeve have openings registering with each other, and wherein said spring means consists of two substantially U-shaped springs disposed at opposite sides of the two telescoped sleeves, the free ends of said springs being engaged with the registering openings of the inner and outer sleeves respectively.

References Cited in the file of this patent

UNITED STATES PATENTS

| | | |
|---|---|---|
| 1,692,067 | Welsh | Nov. 20, 1928 |
| 1,813,352 | Haberlin | July 7, 1932 |
| 2,578,628 | Hartman | Dec. 11, 1951 |
| 2,578,629 | Hartman | Dec. 11, 1951 |
| 2,578,630 | Hartman | Dec. 11, 1951 |